United States Patent [19]

Peng

[11] Patent Number: 4,727,279
[45] Date of Patent: Feb. 23, 1988

[54] PIEZOELECTRIC KNOCK SENSOR

[75] Inventor: Yuchi P. Peng, Noblesville, Ind.

[73] Assignee: General Motors Corporation, Detroit, Mich.

[21] Appl. No.: 43,980

[22] Filed: Apr. 29, 1987

[51] Int. Cl.⁴ .......................................... H01L 41/08
[52] U.S. Cl. .................................... 310/329; 310/321; 73/35
[58] Field of Search ............... 310/321, 323, 329, 324; 73/35, 651, 517 AV; 123/425, 435

[56] References Cited

U.S. PATENT DOCUMENTS

| 4,254,354 | 3/1981 | Keem. | |
|---|---|---|---|
| 4,371,804 | 2/1983 | Peng et al. | |
| 4,373,378 | 2/1983 | Fujishiro et al. | |
| 4,630,465 | 12/1986 | Hatton | 310/324 X |
| 4,655,081 | 4/1987 | Burdess | 310/329 X |

FOREIGN PATENT DOCUMENTS

| 0014133 | 2/1981 | Japan | 73/35 |
|---|---|---|---|
| 0119818 | 2/1981 | Japan | 73/35 |
| 0012514 | 2/1981 | Japan | 73/35 |
| 0119826 | 9/1981 | Japan | 73/35 |

Primary Examiner—Mark O. Budd
Attorney, Agent, or Firm—Robert M. Sigler

[57] ABSTRACT

A knock sensor includes a circular mounting surface with a flat, self-resonant vibration element and piezoelectric disk coaxially mounted thereon. The vibration element comprises a central circular portion and a pair of outer semicircular portions of larger radius, the outer semicircular portions being shifted in opposite direction along their common border from the axis by an equal distances and each being divided into an equal number of sectors by radial slots centered on the axis and extending outward from the first radius with equal angles therebetween to from diametrically opposed pairs of similarly shaped and sized vibrating sectors. The pairs of sectors have resonant frequencies together forming a sensor passband wider than the individual passbands of the pairs taken separately. In addition, differences in resonant frequency between members of a pair due to misalignment of the axes of the vibration element and mounting surface do not significantly affect the sensor passband.

1 Claim, 8 Drawing Figures

PIEZOELECTRIC KNOCK SENSOR

BACKGROUND OF THE INVENTION

This invention relates to a knock sensor for a spark ignited, internal combustion engine and particularly to such a sensor comprising a multiply tuned vibrator combined with a piezoelectric transducer.

It has been taught in the prior art that the phenomenon of knock in a spark ignited, internal combustion engine is associated with vibrations of engine components at specific frequencies but that there is sometimes a great deal of noise at frequencies close to the specific frequencies. In addition, the specific frequencies often vary slightly from one combustion chamber to another or with changing engine operating conditions. Therefore, it is desirable that the system have high frequency selectivity but with a passband somewhat wider than that available from a single tuned element.

The prior art includes interactive sensors, such as that shown in U.S. Pat. No. 4,254,354 to John E. Keem, issued Mar. 3, 1981, in which the resonant frequency is a function of the interaction between the sensor vibrating mass and the mass of the component on which it is mounted. The prior art also shows self resonant sensors, in which the resonant frequency is determined by the vibrating mass of the sensor only. Such sensors may use multiple separate vibrating elements having resonant frequencies slightly spaced from each other, as shown in U.S. Pat. No. 4,373,378 to Fujishiro et al, issued Feb. 15, 1983, or a single disk placed off-center, as in U.S. Pat. No. 4,371,804 to Peng et al, issued Feb. 1, 1983. In either case, however, special care must be taken in manufacturing for the correct placement of the vibrating element to ensure the desired resonant frequencies.

SUMMARY OF THE INVENTION

This invention is a self resonant, piezoelectric knock sensor for an internal combustion engine which is less sensitive than the prior art to the exact placement of the vibrating element on its supporting member, particularly with regard to centering.

The knock sensor comprises mounting means defining a mounting surface having an axis and being circularly bounded with a first radius, the mounting means and mounting surface, when fixed to the engine, partaking of knock induced vibrations within a predetermined knock passband and other vibrations outside the passband. It further comprises a vibration element affixed to the mounting surface substantially coaxially therewith and comprising a central circular portion of substantially the first radius and a pair of outer semicircular portions of a second radius larger than the first, the outer semicircular portions being shifted in opposite directions along their common border from the axis by an equal distance and each being divided into an equal number of sectors by radial slots centered on the axis and extending outward from the first radius with equal angles therebetween, whereby diametrically opposed pairs of similarly shaped and sized vibrating sectors are created. The sensor further comprises a circular piezoelectric disk of a third radius larger than the first and smaller than the second affixed substantially coaxially over the vibration element for stress thereby during vibration, the piezoelectric disk being effective to generate an electric output signal in response to the stress induced therein.

Each of the diametrically opposed pairs of vibrating sectors has a natural resonant frequency somewhat different from that of the others, since they are slightly different from the others in shape and size. The differences are small, however, so that, together, the pairs define a sensor passband wider than the individual passbands of the pairs taken separately. In addition, differences in resonant frequency between members of a pair due to misalignment of the axes of the vibration element and mounting surface do not significantly affect the sensor passband.

DESCRIPTION OF THE PREFERRED EMBODIMENT

Figure 1:
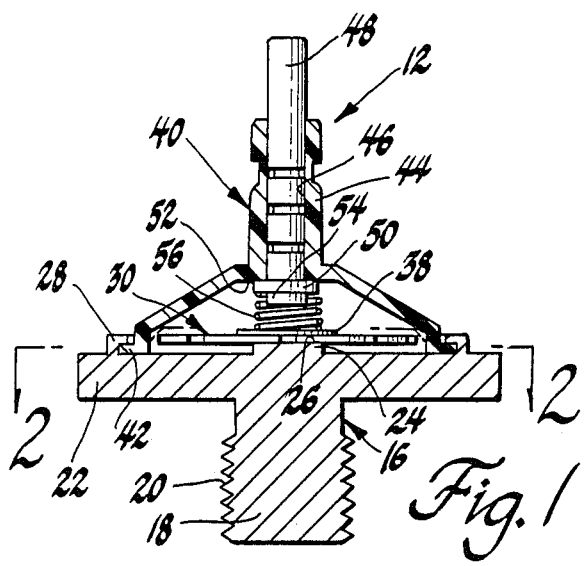
FIG. 1 is a side cutaway view of a knock sensor according to the invention.
Figure 2:
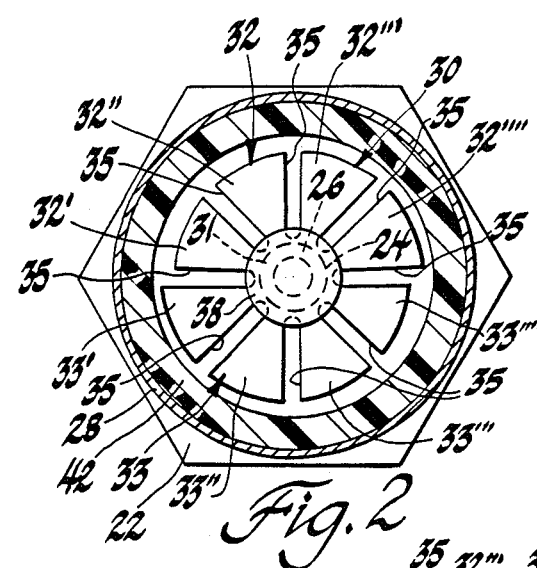
FIG. 2 is a section view along lines 2—2 in FIG. 1.

Referring to FIGS. 1 and 2, sensor 12 comprises a base portion 16 which includes a rigid mounting stud 18 provided with threads 20 in a standard pipe thread configuration for firm attachment within a similarly threaded depression in a component of an internal combustion engine subject to possible knock. Base member 16 further comprises a coaxial hexagonal plate 22 formed integrally therewith, which plate provides wrench engageable peripheral surfaces for the installation of the sensor on the engine and also forms the bottom of the protective case. A portion 24 of mounting stud 18 projects axially beyond plate 22 and ends in a bounded circular flat surface 26 having a diameter, in this embodiment, of 6.5 mm (radius of 3.25 mm). Around the periphery of plate 22 there exists a circular flange 28, which is bent to retain an upper housing element to be described at a later point in this description. The entire base member 16 may be formed from a single piece of steel by known manufacturing techniques.

Sensor 12 includes a multiply resonant vibration element 30, made of leaded brass (specification C33000) with a thickness of 0.725 mm. Element 30 comprises a central circular portion 31, of substantially the same radius as the top surface 26 of portion 24, which is affixed substantially coaxially to the mounting surface 26. Extending radially outward from central circular portion 31 are a pair of outer semicircular portions 32, 33 of a larger radius (10.75 mm). Outer semicircular portions 32 and 33 are shifted in opposite directions, along their common border, from the axis by an equal distance of 0.76 mm; and each is divided into an equal number (4) of sectors (e.g. 32', 32'', 32''', 32'''') by radial slots 35, 1 mm wide, centered on the axis and extending outward from the first radius with equal angles therebetween. Thus, sector 32' is diametrically opposed by sector 33' of substantially the same size and shape and thus having substantially similar vibrating resonant properties. This is similarly true for the other defined pairs of sectors: 32''-33'', 32'''-33''' and 32''''-33''''. Thus opposing pairs of identical vibrating sectors are created.

Figure 3A:
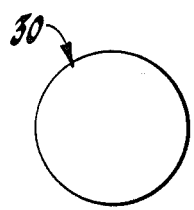
FIGS. 3a–3e illustrate the design of the vibrating element in the knock sensor of FIGS. 1 and 2.
Figure 3B:
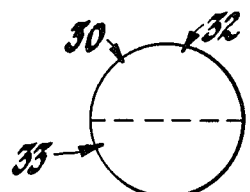
Figure 3C:
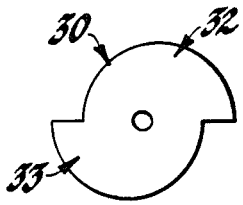
Figure 3D:
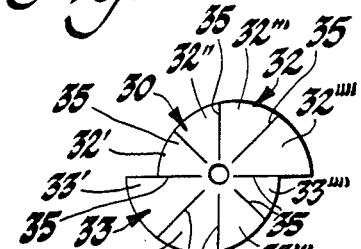
Figure 3E:
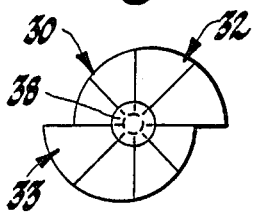

FIGS. 3a–3e show the design process by which the specific inventive shape of member 30 is achieved. A circle of diameter 21.5 mm, representing member 30, is shown in FIG. 3a. It is divided in half along the dotted line shown in FIG. 3b; and the halves, representing semicircular portions 32 and 33, are shifted equally in FIG. 3c, the top half to the right and the bottom to the left, by 0.76 mm from the axis of the circle. The amount of shift is exaggerated in FIGS. 3c-3e to make the process clearer; the actual shift is more accurately portrayed in FIG. 2. Radial slots representing slots 35 appear in FIG. 3d to divide the semicircles into sectors subtending equal angles as indicated. The sectors thus form in pairs, diagonally opposed. Each sector is a mirror image of its opposite but of different shape and area from the others. Once the design process is finished, of course, the element may be stamped in a single piece from a sheet of leaded brass stock—it is the design process rather than the manufacturing process that is shown in FIGS. 3a-3d.

Figure 4:
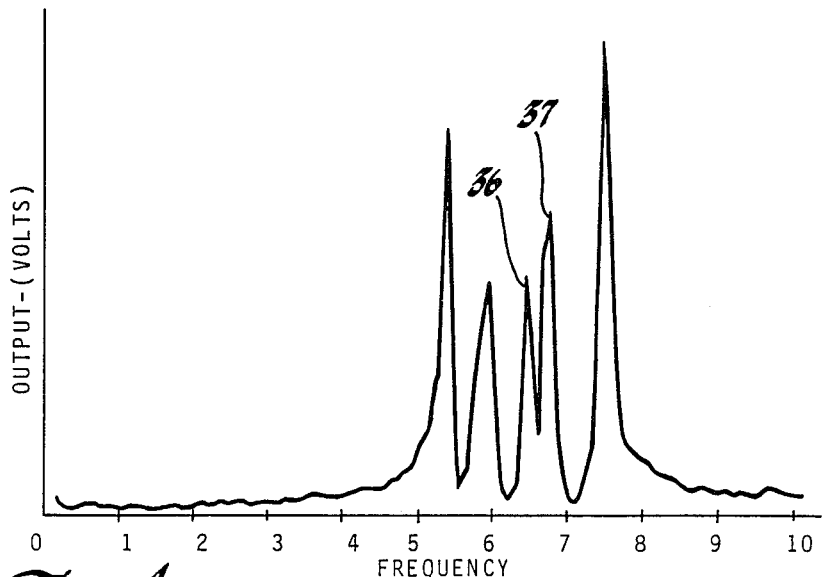
FIG. 4 is a typical response plot for the knock sensor of FIGS. 1 and 2 with a vibrating element designed as shown in FIGS. 3a–3e.

A circular piezoelectric disk 38 is affixed to the top of vibrating element 30. Disk 38 is made of Navy type 2 PZT material with a thickness of 0.5 mm and has a radius of 5 mm, somewhat larger than that of central circular portion 31 so as to be stressed by the vibrations of sectors 32', 33', 32''. . . . The radius is, however, substantially less than the outer radius of the sectors so that the amplitude of vibration of the latter is not unduly suppressed. The addition of the piezoelectric disk 38 overlapping the slots is shown also in FIG. 3e. The combination of member 30 and disk 38 as described will produce an electric output signal with a response curve as shown in FIG. 4, with a series of resonant peaks between the frequencies of 5 KHz and 7.5 KHz, effectively spanning the bandpass defined by these frequencies as far as knock vibrations are concerned but providing great attenuation outside this frequency range.

If the member 30 and piezoelectric disk 38 were assembled perfectly axially on mounting stud 18 the sectors of member 30 would provide pairs of resonant vibrators at adjacent resonant frequencies as described above. However, reasonable manufacturing costs place limits on the accuracy and repeatability of the placement of these parts. If member 30 is slightly off axis, the effect is to slightly increase the resonant frequency of one sector and decrease the resonant frequency of the diametrically opposite sector along the diameter closest to the direction of movement off axis, with other sectors being less affected, particularly those along the diameter at right angles to the direction of shift. This is not inconsistent, however, with the overall desired resonant behavior of the vibrating element, since, as seen in FIG. 4, it tends to split one of the peaks of the response into two adjacent peaks 36 and 37, both of which peaks are still within the overall desired resonance bandwidth. The only penalty is a slight decrease in the height of the double peak as compared to the single peak that would be obtained with essentially perfect mounting. However, the loss of sensitivity in this portion of the desired passband is not sufficient to significantly affect the operation of the sensor. Thus, the sensitivity and passband of the sensor are not significantly affected by misalignments of member 30 with respect to the axis of surface 26 within easily maintained production tolerances. The sensor is inexpensive to produce and has easily controlled response characteristics.

An upper housing element 40, which may be molded from a 30 percent glass filled polyester, includes a lower peripheral flange 42 abutting the upper surface of plate 22 and over which flange 28 of base member 16 is crimped. An upper cylindrical portion 44 of upper housing element 40 defines an opening 46 in which is inserted a terminal element 48 made of an electrically conducting material such as steel. Terminal element 48 has, near its lower end, a radial flange 50 which abuts an inner surface 52 of upper housing element 40. The lower end 54 of terminal element 48 projects past flange 50 to center the upper end of a coil spring 56, the lower end of which engages the upper surface of piezoelectric disk 38. Spring 56 is primarily for electrical connection between piezoelectric disk 38 and terminal 48 and is therefore made from an electrically conducting material such as steel. It is provided with sufficient force in its compressed condition to ensure good electrical contact with piezoelectric disk 38 and with flange 50. The diameter of spring 56 is smaller than the diameter of mounting surface 26, so that spring 56 does not affect the vibrating characteristics of the vibrating sectors 32, 32', 33 . . .

The embodiments of the invention in which an exclusive property or privilege is claimed are defined as follows:

1. A knock sensor for an internal combustion engine subject to knock induced vibrations within an engine determined frequency band and other vibrations not within the frequency band, the sensor comprising, in combination:

mounting means defining a mounting surface having an axis and being circularly bounded with a first radius, the mounting means and mounting surface, when fixed to the engine, partaking of the knock induced and other vibrations;

a vibration element affixed to the mounting surface substantially coaxially therewith and comprising a central circular portion of substantially the first radius and a pair of outer semicircular portions of a second radius larger than the first, the outer semicircular portions being shifted in opposite directions along their common border from the axis by an equal distance and each being divided into an equal number of sectors by radial slots centered on the axis and extending outward from the first radius with equal angles therebetween, whereby diametrically opposed pairs of similarly shaped and sized vibrating sectors are created, each pair of sectors having a natural resonant frequency somewhat different from that of the others so that, together, the pairs define a sensor passband wider than the individual passbands of the pairs taken separately and, in addition, differences in resonant frequency between members of a pair due to misalignment of the axes of the vibration element and mounting surface do not significantly affect the sensor passband; and a circular piezoelectric disk of a third radius larger than the first and smaller than the second, the piezoelectric disk being affixed substantially coaxially over the vibration element for stress thereby during vibration, the piezoelectric disk being effective to generate an electric output signal in response to the stress induced therein.

* * * * *